United States Patent
Dobbs

[19]

[11] Patent Number: 6,113,357

[45] Date of Patent: Sep. 5, 2000

[54] HYDRAULIC TURBINE COMPRESSOR

[76] Inventor: Rocky Dobbs, P.O. Box 2463, Hobbs, N. Mex. 88240

[21] Appl. No.: 09/083,018

[22] Filed: May 21, 1998

[51] Int. Cl.$^7$ ..................................................... F04B 3/00
[52] U.S. Cl. .......................... 417/244; 417/390; 417/407; 251/205; 251/208; 166/67
[58] Field of Search ..................... 417/244, 390, 417/407; 251/205, 208, 212; 166/67

[56] References Cited

U.S. PATENT DOCUMENTS

| | | | |
|---|---|---|---|
| 1,738,135 | 12/1929 | Bannister | 137/625.3 |
| 2,698,055 | 12/1954 | Williams | 166/75 |
| 3,244,106 | 4/1966 | Guy | 417/244 |
| 3,360,042 | 12/1967 | Marion | 166/0.6 |
| 3,550,696 | 12/1970 | Kennedy | 175/25 |
| 4,066,123 | 1/1978 | Skinner et al. | 166/68.5 |
| 4,213,476 | 7/1980 | Bresie et al. | 137/2 |
| 4,505,333 | 3/1985 | Ricks, Sr. | 166/267 |
| 4,516,606 | 5/1985 | Worley | 137/625.3 |
| 4,848,471 | 7/1989 | Bencze | 166/335 |
| 4,972,904 | 11/1990 | Godare | 166/77 |
| 5,417,083 | 5/1995 | Eber | 62/528 |
| 5,558,502 | 9/1996 | Fukazawa et al. | 417/36 |
| 5,863,186 | 1/1999 | Green et al. | 417/53 |

Primary Examiner—Charles G. Freay
Assistant Examiner—Robert Z. Evora
Attorney, Agent, or Firm—Henderson & Sturm LLP

[57] ABSTRACT

A hydraulic turbine mounted in-line between a gas production facility and the inlet of the sales lines for boosting pressure sufficiently to insert natural gas from the production facility into the sales line when the sale line pressure is at a high level. The turbine includes a compact turbine pump having several stages of compression with each compression stage including a 15-horse power motor that drives a hydraulic pump. A variable speed control is attached to the motor to allow the user to control the speed of the pump. Each pump stage has its own hydraulic motor that drives a turbine blade inside an enclosure. Pressure at each stage is controlled by means of an adjustable vane that has a stationary plate with a succession of fixed openings. The stationary plate is in face to face contact with a moving plate of similar design. The moving plate rotates at the center and may be adjusted by means of an elongated bolt assembly which adjusts the moving plate clockwise or counterclockwise. This action increases or decreases the size of the opening thus controlling pressure inside the particular stage.

5 Claims, 5 Drawing Sheets

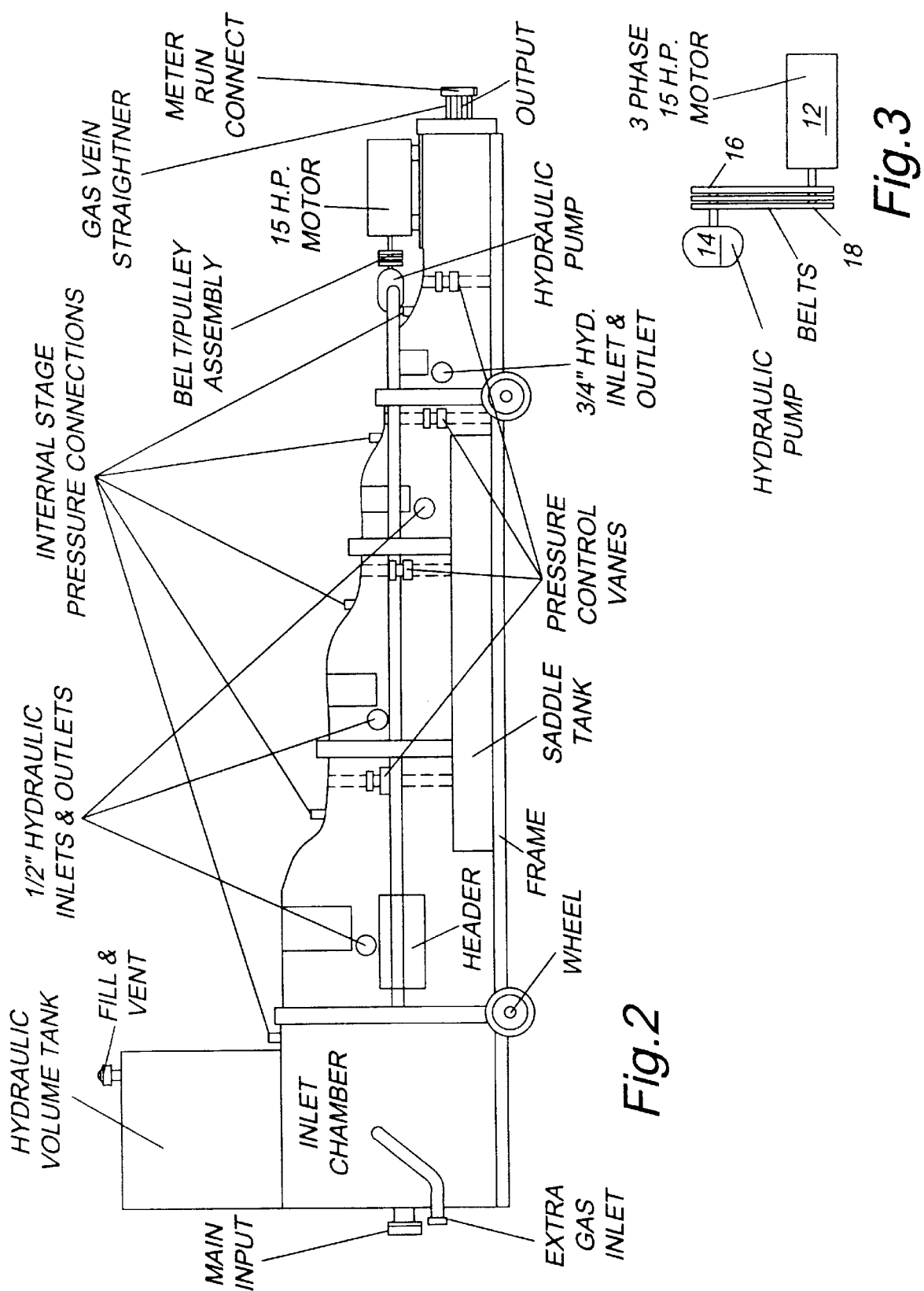

6,113,357

HYDRAULIC TURBINE COMPRESSOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of turbines, and more particularly to low or high pressure hydraulic turbine compressors.

2. Description of Related Art

As can be seen by reference to the following U.S. Pat. Nos. 2,698,055; 3,360,042; 3,550,696; 4,066,123; 4,213,476; and 4,972,904, the prior art is replete with myriad and diverse turbine compressors.

While all of the aforementioned prior art constructions are more than adequate for the basic purpose and function for which they have been specifically designed, they are uniformly deficient with respect to their failure to provide a simple, efficient, and practical low or high pressure hydraulic turbine compressor.

As a consequence of the foregoing situation, there has existed a longstanding need for a new and improved high pressure hydraulic turbine compressor and the provision of such a construction is a stated objective of the present invention.

BRIEF SUMMARY OF THE INVENTION

Briefly stated, the present invention provides a hydraulic turbine mounted in-line between a gas production facility and the inlet of the sales lines for boosting pressure sufficiently to insert natural gas from the production facility into the sales line when the sale line pressure is at a high level. The turbine includes a compact turbine pump having several stages of compression with each compression stage including a 15-horse power motor that drives a hydraulic pump. A variable speed control is attached to the motor to allow the user to control the speed of the pump. Each pump stage has its own hydraulic motor that drives a turbine blade inside an enclosure. Pressure at each stage is controlled by means of an adjustable vane that has a stationary plate with a succession of fixed openings. The stationary plate is in face to face contact with a moving plate of similar design. The moving plate rotates at the center and may be adjusted by means of an elongated bolt assembly which adjusts the moving plate clockwise or counterclockwise. This action increases or decreases the size of the opening thus controlling pressure inside the particular stage.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 2 is a side elevational view thereof;

FIG. 3 is a top plan view showing the belt connection between the motor and the hydraulic pump;

DETAILED DESCRIPTION OF THE INVENTION

Figure 1:
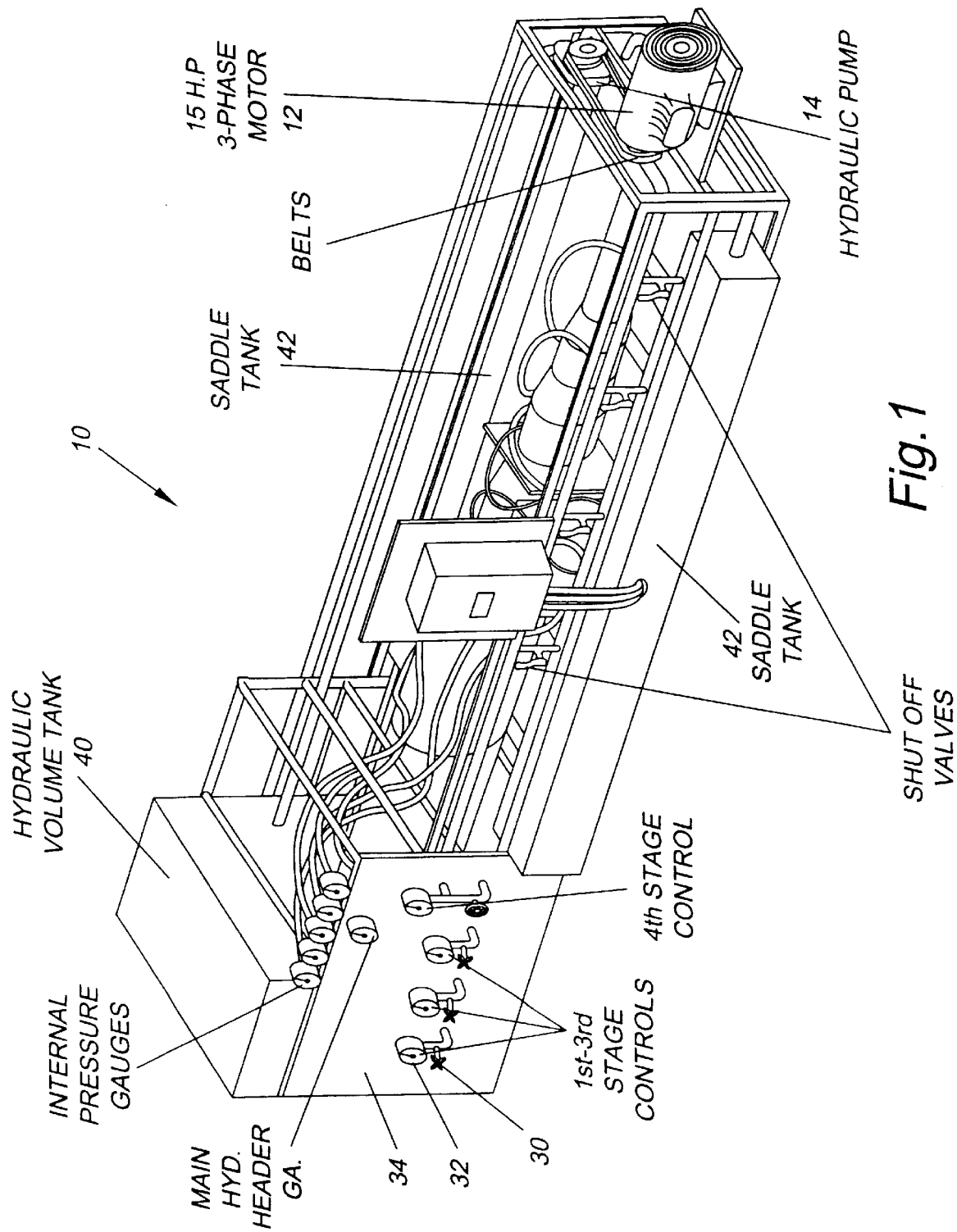
FIG. 1 is a perspective view of the hydraulic turbine compressor of the present invention.
Figure 4:
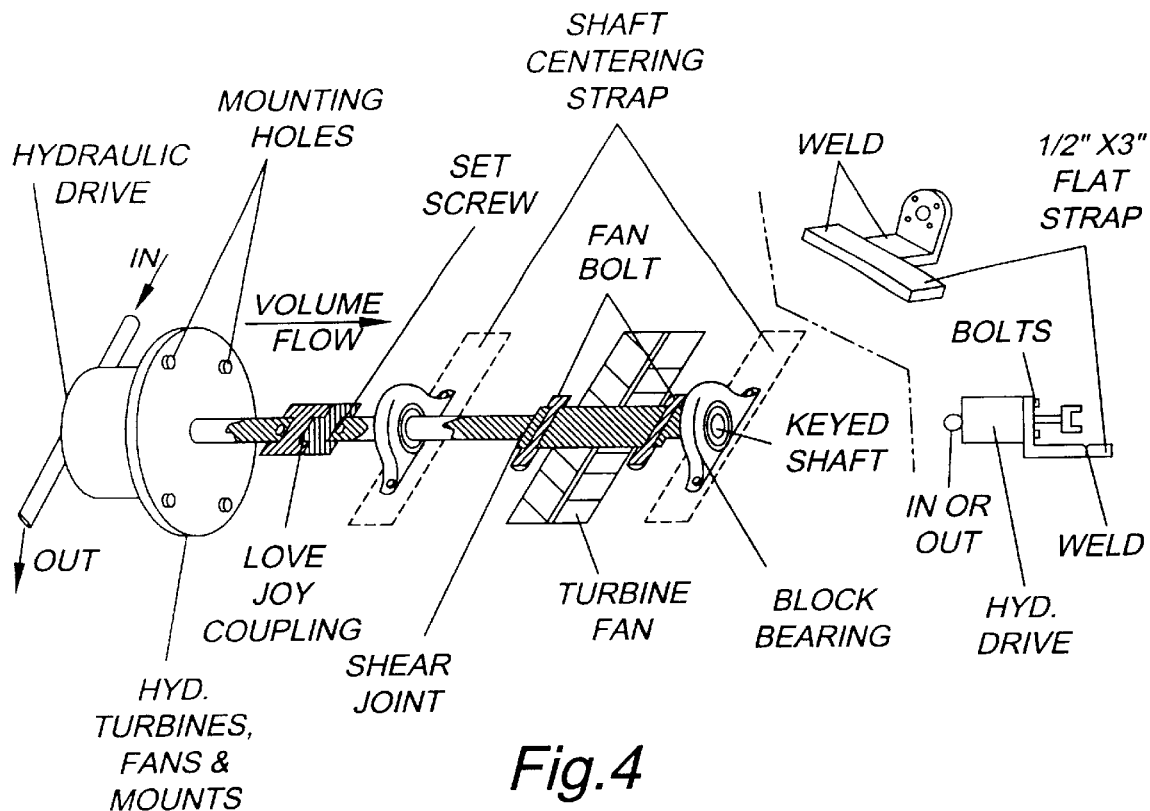
FIG. 4 is a schematic view of one of the turbine fans and the hydraulic pump.

As can be seen by reference to the drawings, and in particularly to FIG. 1, the hydraulic turbine compressor that forms the basis of the present invention is designated generally by the reference number 10. The primary function of the hydraulic turbine 10 is to increase the amount of production from a natural gas well head by pumping more natural gas into the sales line thereby storing more natural gas at the production facility owned by the gas company. This feature of the hydraulic turbine 10 allows more gas to be sold at the well head (sales line) since production is not limited to the amount of gas pressure that can be directly pumped into the production facility. This allows the gas producer to have more control over the sale of the product.

Figure 7:
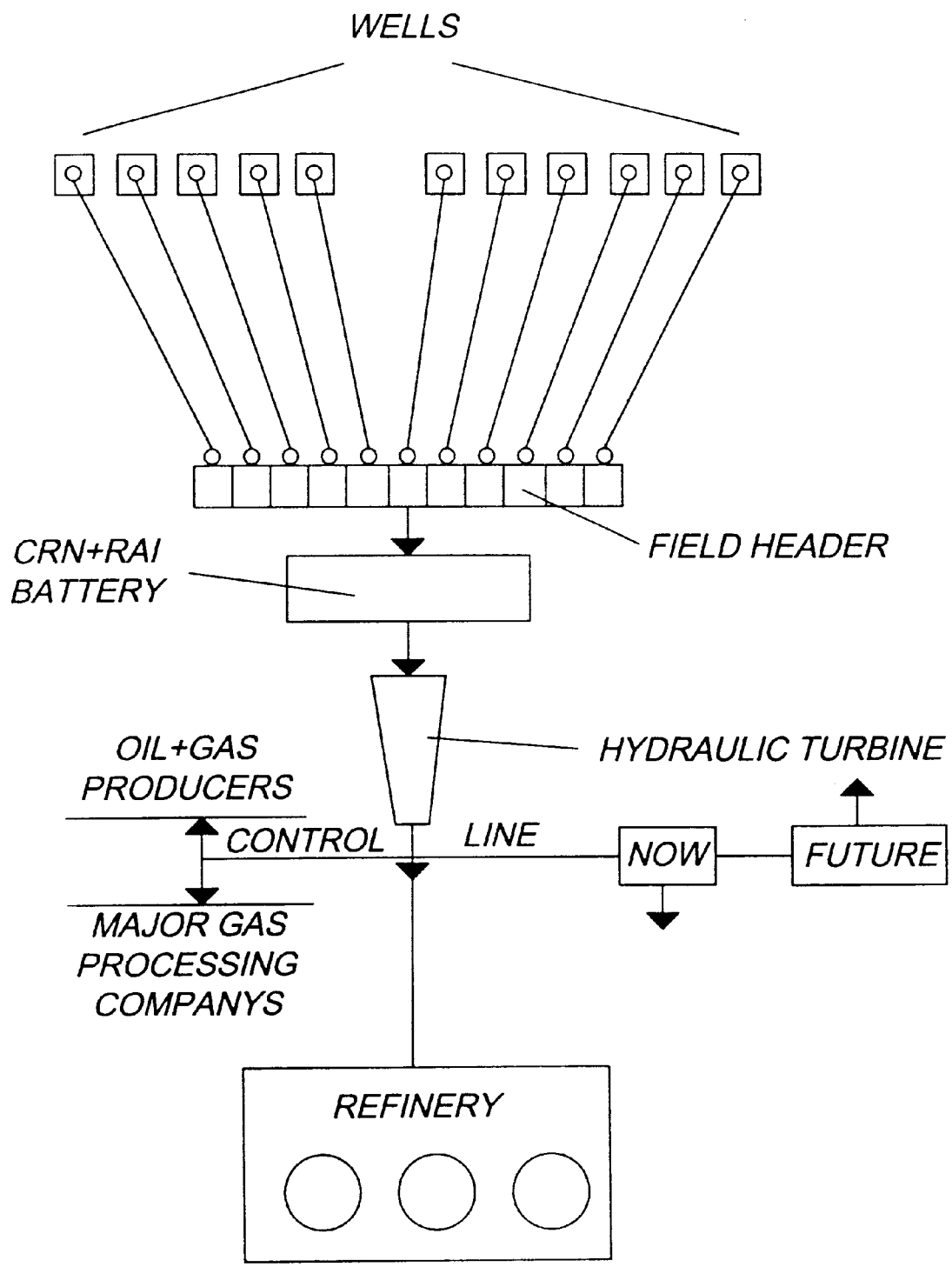
FIG. 7 is a schematic view illustrating the positioning of the hydraulic turbine compressor between a field header and a refinery.

As shown in FIG. 7, the hydraulic turbine 10 installs between the gas producing well and sales line (input manifold to the gas production/refinery). Because of this connection, the gas producing well is capable of selling more gas to the production facility because it can pump a higher capacity or volume of gas into the production facility that would normally be allowed under normal line pressure conditions. This keeps the gas production operational when it would normally stop and not produce due to the sales line dictating a full condition (due to back pressure) to the gas producing well. This also provides an increase in oil production since the sales line will not be holding up production due to back pressure. In addition, the hydraulic turbine 10 has the ability to take all gas (casing gas, bottom hole gas, field gas and any choked gas) and force feed the sales line. Problems with the EPA are also lessened because of the ability of the hydraulic turbine 10 to pull sweet and sour gas from the production tanks. The hydraulic turbine 10 also solves the following problems: it decreases oil field pressure, replaces old style gas compressors used on gathering lines while providing less maintenance and lower cost. Also, it will double gas sales, but increase oil production by being able to take all gas and force feed the sales lines.

Figure 5:
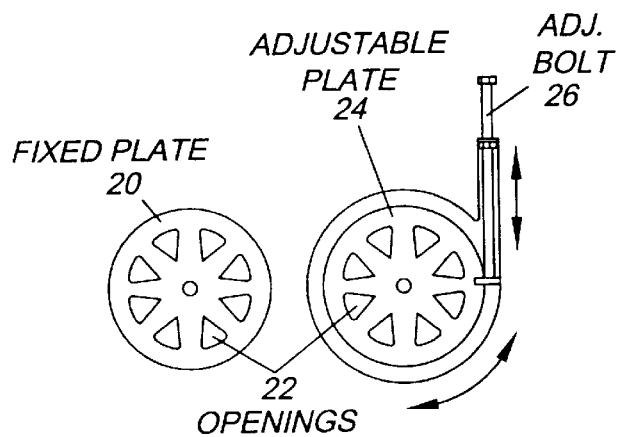
FIG. 5 is a schematic view illustrating the adjustment for controlling pressure.
Figure 6:
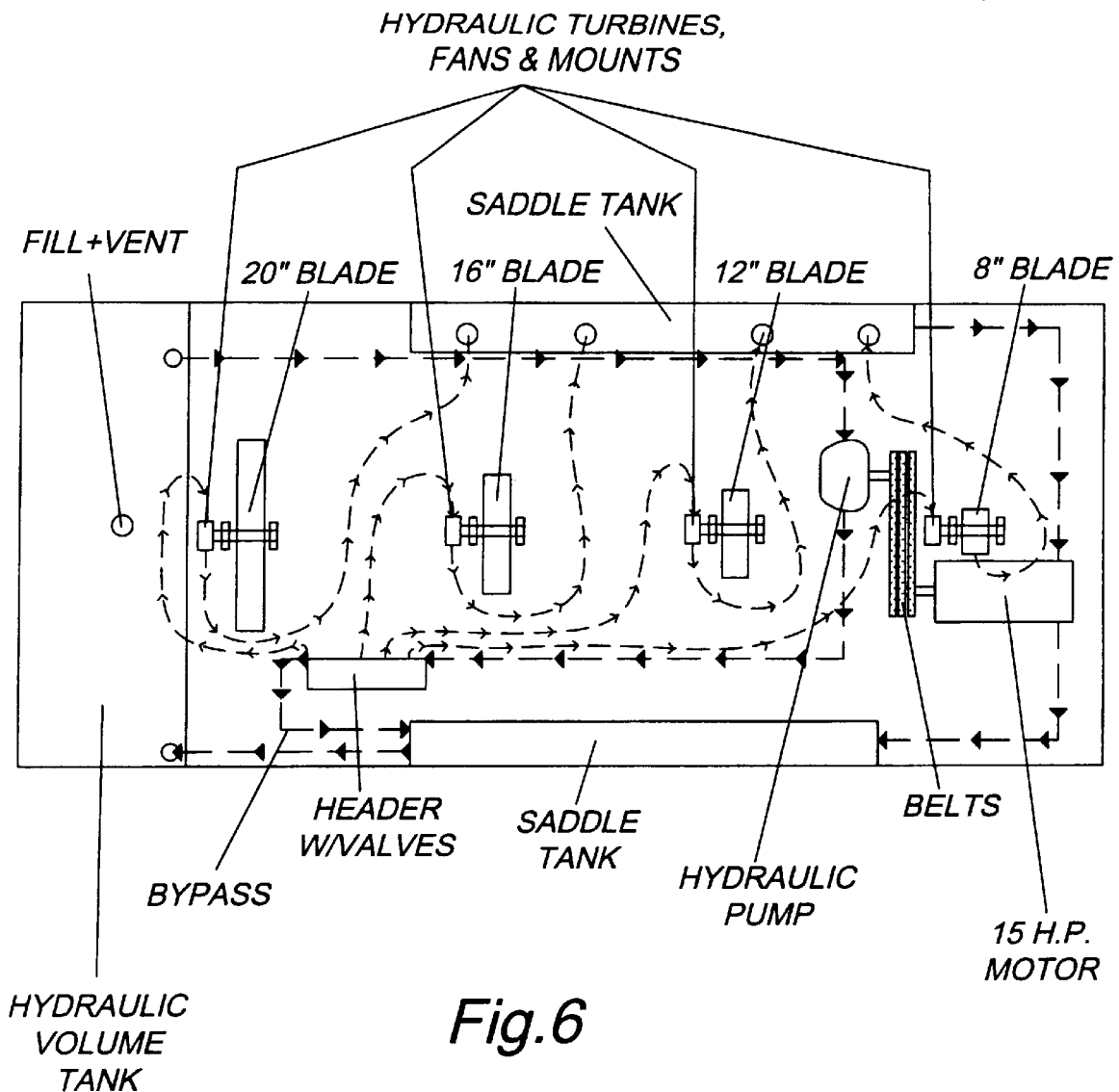
FIG. 6 is a top plan view illustrating the flow pattern.

The hydraulic turbine 10 is a compact turbine pump that uses several stages of compression in order to compress and pump gas from the production site to the sales line manifold. The primary source for powering the hydraulic turbine 10 is a 15 HP electric motor 12 that drives a hydraulic pump 14. A four inch belt pulley 16 on the pump six inch pulley 18 on 15 HP three phase motor 12 is utilized in order to increase volume movement. The 15 HP motor 12 is connected to a Hitachi J300 variable speed controller in order to control header pressure and give the user all the control needed. The output of the hydraulic pump 14 in turn drives several hydraulic motors. Each pump stage has its own hydraulic motor that drives a turbine blade inside an enclosure. As illustrated in FIG. 5, pressure in each stage is controlled by means of an adjustable vane that has a stationary plate 20 with a succession of fixed openings 22. The stationary plate 20 is in face to face contact with a moving plate 24 of similar design. The moving plate 24 rotates at the center and may be adjusted by means of an elongated bolt assembly 26 which adjusts the moving plate 24 clockwise or counter-clockwise. This action increases or decreases the size of the openings 22 thus controlling pressure inside that particular stage. There are four stages of pumping (each of similar design) with the first stage (input) being the largest diameter and the last stage (output) being the smallest. The stages become consecutively smaller until the output of the hydraulic turbine 10 is reached. This staging provides the final compression required in order to pump the gas to its intended destination (the gas company). Each hydraulic pump is controlled by means of hand operated hydraulic valves. Monitoring of hydraulic pressure is accomplished by means of a hydraulic pressure gauge assigned for each hydraulic motor. Since each hydraulic motor may be monitored and controlled separately, the entire output of the hydraulic turbine 10 may be monitored, tuned and controlled for optimum performance. The valves 30 and gauges 32 are located on a control panel 34 for use by the operator, providing easy access control capability for the operator.

The main tank 40 and two saddle tanks 42 have a combined volume of approximately 160 gallon low grade hydraulic fluid and oil (can use lite oil). The flow starts from the bottom of the volume tank with two inch steel pipe welded solid, with a valve to block the tank and pump to the header is a two inch welded pipe including a by-pass.

In use, the hydraulic turbine 10 is placed between the well head and the sale line (header) in order to sell more gas to the gas company (refinery), by compressing more gas from the well head into the sales line. Producers are able to pump 65,000 cubic feet per hour into a 35 PSI sales line. Use of the hydraulic turbine 10 allows the producer at the well head to sell more gas to the refinery by pushing the gas from the well head past the compression pressure normally found at the well head.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A hydraulic turbine compressor having four compression stages, the turbine comprising:

each of the four compression stages being consecutively smaller than the previous stage, and each including a drive motor operably attached to a hydraulic pump, and a turbine blade driven by the hydraulic pump, wherein each turbine blade comprises a valve including a stationary plate having a first series of openings and an adjustable plate having a second series of openings movable with respect to the first series of openings, the stationary plate and the adjustable plate being disposed in face to face contact such that the first series of openings on the stationary plate are selectively positionable with respect to the second series of openings on the adjustable plate; and a bolt assembly disposed in contact with the adjustable plate, the bolt assembly being selectively movable between a retracted and extended position, wherein movement of the bolt assembly rotates the adjustable plate with respect to the stationary plate and moves the second series of openings between a fully registered and partially registered position with the first series of openings, whereby pressure of each stage is controlled.

2. A hydraulic turbine compressor having multiple compression stages, comprising:

each stage including a drive motor operably attached to a hydraulic pump, and a turbine blade driven by the hydraulic pump, wherein each turbine blade comprises a valve including a stationary plate having a first series of openings and an adjustable plate having a second series of openings, movable with respect to the first series of openings, the stationary plate and the adjustable plate being disposed in face to face contact such that the first series of openings on the stationary plate are selectively positionable with respect to the second series of openings on the adjustable plate;

a bolt assembly disposed in contact with the adjustable plate, the bolt assembly being selectively movable between a retracted and extended position wherein movement of the bolt assembly rotates the adjustable plate with respect to the stationary plate and moves the second series of openings between a fully registered and partially registered position with the first series of openings, whereby pressure of each stage is controlled; and wherein the turbine compressor is operably positioned in-line between a gas production facility and an inlet of a sales line, wherein pressure is boosted sufficiently to insert natural gas from the production facility into the sales line when the sales line pressure is at a high level.

3. The hydraulic turbine compressor of claim 2 including four compression stages.

4. The hydraulic turbine compressor of claim 3 wherein each stage is consecutively smaller than the previous stage.

5. The hydraulic turbine compressor of claim 2 wherein each stage is consecutively smaller than the previous stage.

* * * * *